United States Patent
Andoh

(10) Patent No.: US 7,028,148 B2
(45) Date of Patent: Apr. 11, 2006

(54) PROGRAM EXECUTING DEVICE AND METHOD FOR EXECUTING PROGRAMS

(75) Inventor: Junichi Andoh, Kanagawa (JP)

(73) Assignee: Mitsumi Electric, Co. Ltd., Tokyo (JP)

( * ) Notice: Subject to any disclaimer, the term of this patent is extended or adjusted under 35 U.S.C. 154(b) by 112 days.

(21) Appl. No.: 10/166,958

(22) Filed: Jun. 11, 2002

(65) Prior Publication Data

US 2002/0188823 A1    Dec. 12, 2002

(30) Foreign Application Priority Data

Jun. 11, 2001    (JP)    ............................... 2001-175341

(51) Int. Cl.
*G06F 12/06*    (2006.01)
(52) U.S. Cl. .................. 711/154; 711/100; 711/102; 711/103; 711/202; 713/1; 713/2; 710/1; 710/2; 710/3; 710/4
(58) Field of Classification Search ............... 710/1, 710/2–4; 709/223, 226; 713/1–2; 714/21; 711/162, 154–156, 100, 102–103, 202
See application file for complete search history.

(56) References Cited

U.S. PATENT DOCUMENTS

| | | | | |
|---|---|---|---|---|
| 3,701,893 A | * | 10/1972 | Shimaya et al. | ............... 341/60 |
| 6,023,750 A | | 2/2000 | Hansen et al. | ............... 711/220 |
| 6,141,700 A | * | 10/2000 | Iwata | .............................. 710/3 |
| 6,202,143 B1 | * | 3/2001 | Rim | ............................ 712/210 |
| 6,220,510 B1 | | 4/2001 | Everett et al. | ............... 235/380 |
| 6,289,429 B1 | * | 9/2001 | Okamoto | ..................... 711/202 |
| 6,308,265 B1 | * | 10/2001 | Miller | ........................... 713/2 |
| 6,598,112 B1 | * | 7/2003 | Jordan et al. | ................... 711/2 |
| 2002/0178352 A1 | * | 11/2002 | Lambino et al. | ............... 713/2 |
| 2003/0023709 A1 | * | 1/2003 | Alvarez et al. | .............. 709/223 |

FOREIGN PATENT DOCUMENTS

EP    1100014 A2    10/2000
JP    404349535 A    * 12/1992

* cited by examiner

*Primary Examiner*—Matthew Kim
*Assistant Examiner*—Zhuo H. Li
(74) *Attorney, Agent, or Firm*—Patents & TMS, P.C.

(57) ABSTRACT

A program executing device that can execute two programs produced using the same source program is disclosed. The program executing device 1 is generally composed from a processor (CPU) 2, a program memory (flash memory) 3, a storage memory (SRAM) 4, an I/O port 5, an address decoder 6, an address bus 11, a data bus 12, a read/write signal line 22, boot signal lines 31, 32 and 33, and an access object signal line 41. The address decoder 6 is adapted to send a boot signal to the storage memory 4 when the access object signal 302 is in either of 002 or 003. In this way, the program executing device 1 coverts two first address signals which are different only in their access object signals into the same second address signal. This makes it possible to reduce the capacity of the storage memory.

9 Claims, 5 Drawing Sheets

| | A23 | A22 | A21 | A20 | A19 | A18 | A17 | A16 | A15 | A14 | A13 | A12 | A11 | A10 | A9 | A8 | A7 | A6 | A5 | A4 | A3 | A2 | A1 | A0 |
|---|---|---|---|---|---|---|---|---|---|---|---|---|---|---|---|---|---|---|---|---|---|---|---|---|
| First Address Signal "a" | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| | A23~A15 | | | | | | | | | A14~A0 | | | | | | | | | | | | | | |
| | 0 | | | | 002 | | | | | 0 | | | | | 0000 | | | | | | | | | |
| First Address Signal "b" | 0 | 0 | 0 | 0 | 0 | 0 | 0 | 1 | 0 | 1 | 1 | 1 | 1 | 1 | 1 | 1 | 1 | 1 | 1 | 1 | 1 | 1 | 1 | 1 |
| | A23~A15 | | | | | | | | | A14~A0 | | | | | | | | | | | | | | |
| | 0 | | | | 002 | | | | | 7 | | | | | F | | | | | F | | F | F | F |
| First Address Signal "c" | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 |
| | A23~A15 | | | | | | | | | A14~A0 | | | | | | | | | | | | | | |
| | 0 | | | | 003 | | | | | 8 | | | | | 0000 | | | | | | | | | |
| First Address Signal "d" | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 |
| | A23~A15 | | | | | | | | | A14~A0 | | | | | | | | | | | | | | |
| | 0 | | | | 003 | | | | | F | | | | | 7FFF | | | | | | | | | |

Fig. 3

PROGRAM EXECUTING DEVICE AND METHOD FOR EXECUTING PROGRAMS

BACKGROUND OF THE INVENTION

1. Area of the Invention

This invention relates to a program executing device which can execute programs using a processor, a program memory and a storage memory, and a method for executing programs by the device.

2. Description of the Prior Art

There is known a program executing device which execute programs using a processor, a program memory and a storage memory. This program executing device is called as a microcomputer, and it is mounted on various electrical or electronic apparatuses such as personal computers, optical disc drives, mobile phones, game apparatuses, televisions, microwave ovens, air conditioners and the like.

The program executing device is used for controlling various component devices (peripheral devices) constituting the electrical or electronic apparatus. For example, when such a program executing device is used in an optical disc drive, it is used for supplying input data to be inputted into a laser diode or an actuator or for analyzing output data outputted from switches and sensors and the like.

In such program executing devices, when a bug is found in the program or when the function of the electrical or electronic apparatus is to be upgraded, a previous program stored in a program memory thereof is overwritten with a new program, thereby debugging the bug or upgrading the function.

In such a program memory, another program (second program) for emergency use is normally stored in addition to the previous program to be rewritten (first program). The second program is used when the previous program (first program) is not properly overwritten with a new program so that the first program can not be executed properly. In such a case, the second program can operate the electrical or electronic apparatus instead of the first program.

However, if the first and seconds program are produce using the same source program, write and read of data used for executing the first and second programs must be carried out in separate memory areas in a storage memory.

Therefore, the storage capacity of the storage memory is necessarily increased, thus resulting in increased cost of the electrical or electronic apparatus equipped with the program executing device. Further, this also increases size of the electrical or electronic apparatus, thus leading to increased weight of the apparatus.

SUMMARY OF THE INVENTION

It is therefore an object of the present invention to provide a program executing device which can reduce a memory capacity of a storage memory in which two programs produced using the same source program are stored, and a method for executing the programs by the device.

In order to achieve the above-object, the present invention is directed to a program executing device, which comprises a processor; a program memory in which a first program and a second program are stored; a storage memory for performing write and read of data used for executing the first and second programs, the storage memory including first and second memory areas, in which the first program is programmed so as to access the first memory area of the storage memory and the second program is programmed so as to access the second memory area of the storage memory; and memory area converting means which is configured so that in a case where the processor performs write and read of the data in the second memory area based on the second program, the processor is adapted to access the first memory area when the processor is to access the second memory area.

In the present invention, it is preferred that the memory area converting means has a plurality of signal lines through which address signals are outputted, in which the memory area converting means is configured so that two address signals which are different from each other only in their bit signals which are outputted to one of the signal lines are converted into the same address signal.

Further, it is also preferred that the signal lines for outputting the address signals includes at least one access object signal line which outputs an access object signal in each address signal, in which the memory area converting means includes boot signal transmission means which is connected to the processor through the access object signal line for booting up the storage memory based on the access object signal, wherein the boot signal transmission means is configured so that even in the case where the access object signal which is received when the processor accesses the second memory area based on the second program is different from the access object signal which would be received when the processor accesses the first memory area based on the first program, the processor sends the same boot signal as that which is sent when the processor would access the first memory area to boot up the storage memory when the processor is to access the second memory area.

In this case, it is preferred that the predetermined signal line is opened.

Further, it is also preferred that the first program is a program which is executed in performing ordinary operation, and the second program is a program which is used only when the first program is not properly executed.

Furthermore, it is also preferred that the program memory includes a program-rewritable non-volatile memory.

Moreover, it is also preferred that the program memory includes a plurality of memory areas and the programs can be rewritten in each of the memory areas.

Another aspect of the present invention is directed to a method for executing programs, such as, for executing a first program which is programmed so that a processor accesses a first memory area of a storage memory and a second program which is programmed so that the processor accesses a second memory area of the storage memory, the method being characterized in a case where the processor performs write and read of the data in the second memory area based on the second program, the processor is adapted to access the first memory area when the processor is to access the second memory area based on the second program.

In this case, it is preferred that two address signals which are different from each other only in their bit signals in a predetermined signal line in a plurality of signal lines for outputting the address signals from the processor are converted into the same address signal, so that when the processor is to access the second memory area based on the second program, the processor is adapted to access the first memory area.

These and other objects, structures and advantages of the present invention will be apparent from the following description of the preferred embodiment when it is considered taken in conjunction with the appended drawings.

BRIEF DESCRIPTION OF THE DRAWINGS

FIG. 3 is a chart which shows an example of first address signals which are transmitted when the processor accesses a first memory area or a second memory area of the storage memory, in which each address signal is represented with a binary code and a hexadecimal code.

DETAILED DESCRIPTION OF THE PREFERRED EMBODIMENTS

Hereinbelow, a detailed description of the preferred embodiments of the present invention will be described with reference to the accompanying drawings.

First Embodiment

Figure 1:
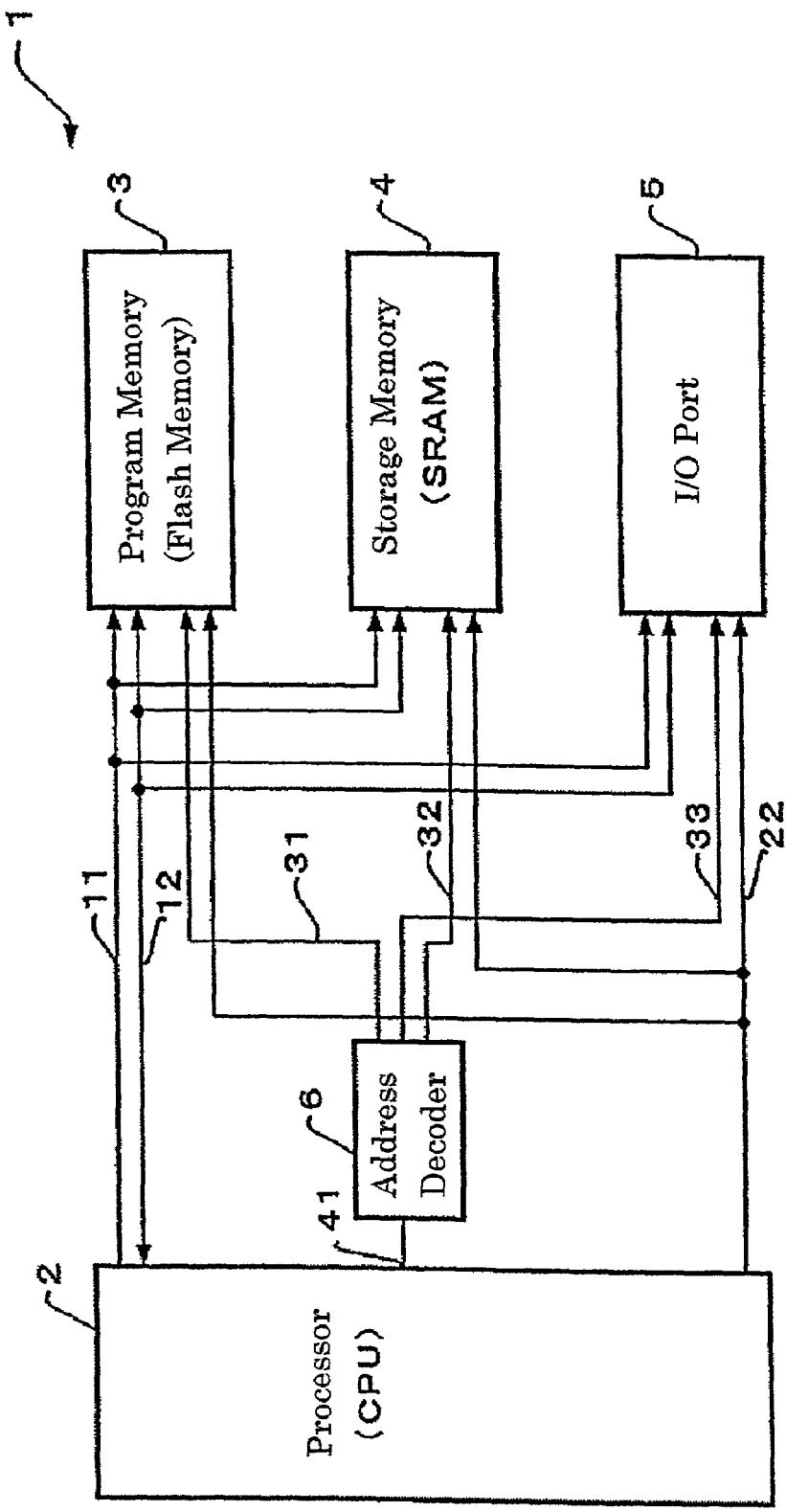
FIG. 1 is a block diagram which shows a first embodiment of a program executing device according to the present invention.
Figure 2:
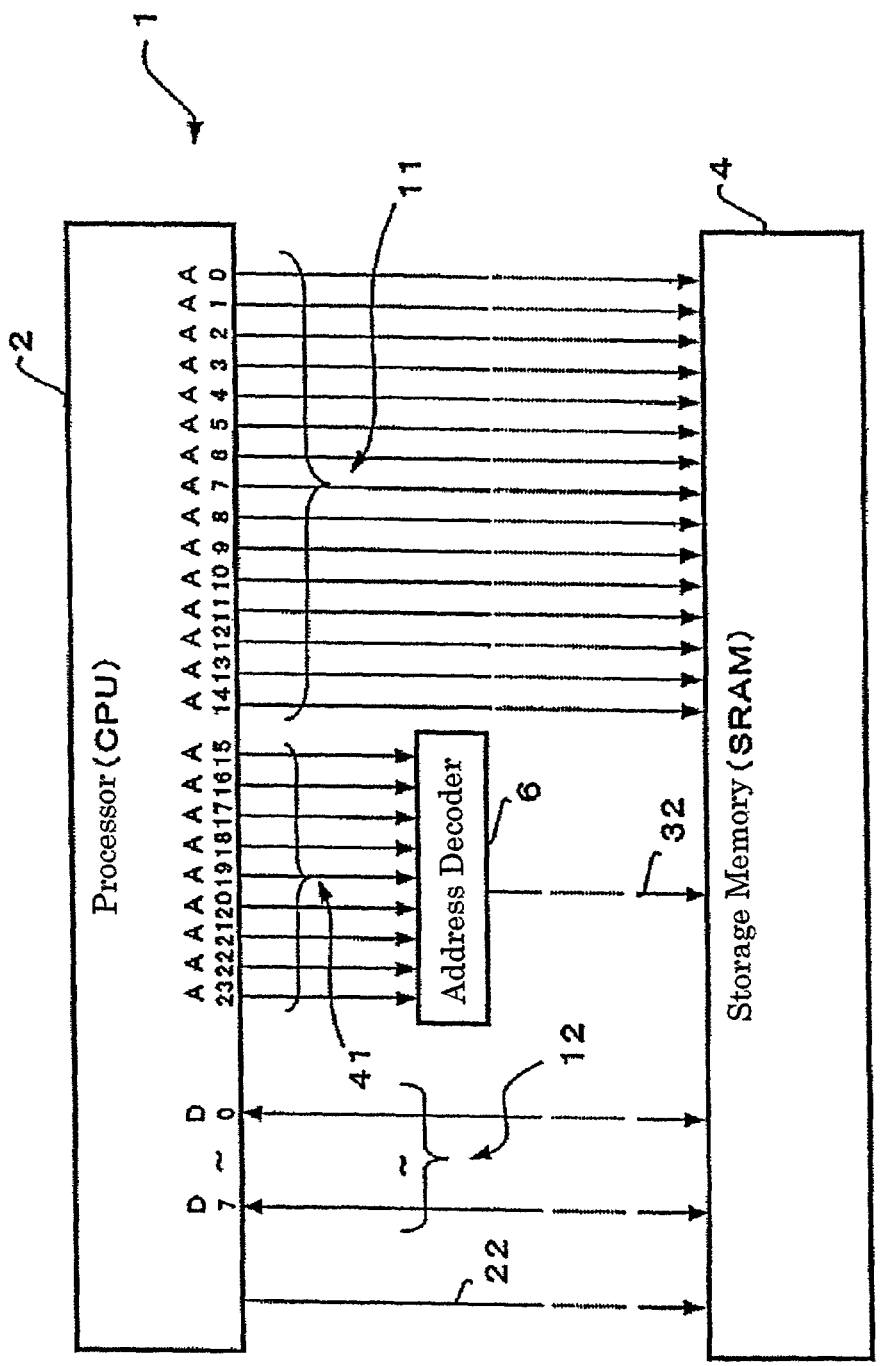
FIG. 2 is a block diagram which shows one example of connection between a processor and a storage memory in the program executing device shown in FIG. 1.

FIG. 1 is a block diagram which shows the first embodiment of the program executing device according to the present invention, and FIG. 2 is a block diagram which shows one example of connection between a processor and a storage memory in the program executing device shown in FIG. 1.

The program executing device 1 shown in these drawings is a device generally called as a microcomputer, and it is mounted on various electrical or electronic apparatuses such as personal computers, optical disc drives, mobile phones, game apparatuses, televisions, microwave ovens, air conditioners and the like.

The program executing device 1 is generally composed from a processor (CPU) 2, a program memory (flash memory) 3, a storage memory (SRAM) 4, an I/O port 5, an address decoder 6, an address bus 11, a data bus 12, a read/write signal line 22, boot signal lines 31, 32 and 33, and an access object signal line 41.

The processor 2 is connected to the program memory 3, the storage memory 4 and the I/O port 5, respectively, through the address bus 11 and the data bus 12.

Further, the processor 2 is also connected to the program memory 3, the storage memory 4 and the I/O port 5, respectively, through the read/write signal line 22.

Furthermore, the processor 2 is also connected to the address decoder 6 through the access object signal line 41. The address decoder 6 is connected to the program memory 3, the storage memory 4 and the I/O port 5 through the boot signal lines 31, 32, 33, respectively.

The processor 2 is called as a CPU (Central Processing Unit), and it is generally composed of an operating section and a control section (not shown in the drawings).

The basic functions of the processor 2 are to read out a program (instructions), to execute the program and to analyze the readout data, and the like.

In more details, the processor 2 carries out computation and logic operations, control for flow of the program, control for writing and reading data to and from the memories, supply of input signal to be inputted into the component devices of the electrical or electronic apparatus (e.g. a laser diode or an actuator in the case of an optical disc drive), and control for fetching output data from switches or sensors, and the like. Hereinbelow, the component devices of the electrical or electronic apparatus such as the laser diode, actuator, switches and sensors and the like are simply referred to "other components".

The processor 2 is constructed from, for example, an eight-bit CPU which can process eight-bits of data as one word at one time in various operations or controls.

Further, the program executing device 1 is constructed so as to have an address space which can be represented with 24 bit data, for example. The processor 2 is operated so as to transmit address signals (first address signals) which designate addresses in the address space to the address decoder 6, the program memory 3, the storage memory 4 or the I/O port 5, respectively, through a plurality of signal lines.

The plural signal lines include the address bus 11 and at least one access object signal line 41. An address designation signal and an access object signal in the first address signal (described below) are outputted to the address bus 11 and the access object signal line 41, respectively.

In this connection, it is to be noted that although in the above embodiment eight-bit data is used as one word, the present invention is not limited thereto. For example, 16-bit data or 32-bit data may be used as one word.

Further, although in the above embodiment the processor 2 is constructed to represent the address space with 24-bit data, the present invention is not limited thereto.

The program memory 3 may be constructed from a rewritable non-volatile memory, and in this embodiment it is constructed from a flash memory.

In this connection, it is to be noted that although in this embodiment the program memory 3 is constructed from a flash memory, the present invention is not limited thereto, and it may be constructed from a ROM (Read Only Memory).

In the program memory 3, data concerning instructions, that is a program is stored. The program is read out from the program memory 3 by the processor 2 so that various operations of the electric or electronic apparatus equipped with the program executing device 1 can be performed.

The program memory 3 has a plurality of memory blocks. In this program memory 3, the program is rewritten by erasing the program previously stored in the memory block and then storing a new program. The rewriting (overwrite) of the program is normally carried out using one block as a unit.

The storage memory 4 is constructed from a RAM (Random Access Memory). Examples of the RAM include a static RAM and a dynamic RAM and the like.

The storage memory 4 is used, for example, when the processor 2 executes a command that reads out a program from the program memory 3 and then writes data to designated memory locations (memory frame) of the storage memory 4, and when the processor 2 executes a command that reads out data from a designated memory frame of the storage memory 4.

In more details, when data is to be written to the designated memory area of the storage memory 4, the storage memory 4 receives data to be written by the control of the processor 2 and then the data is written to the designated frame. Further, when the data is to be read out from the designated memory frame of the storage memory 4, the data is read out from the designated memory frame of the storage memory 4 under the control of the processor 2.

The I/O port 5 constitutes an interface section between the program executing device 1 and other components (component devices).

More specifically, input data sent from the processor 2 is inputted into an input terminal of the I/O port 5, and the other components perform various operations by receiving the input data, such as emission of light from the laser diode and actuation of the actuator and the like. Further, data from the other components such as ON/OFF signals of the switches or detection results of the sensors are outputted from an output port of the I/O port 5, and then the processor 2 receives (fetches) such output data so that the processor 2 performs predetermined operations based on the data or the processor 2 analyzes the data.

The address bus 11 is used for designating addresses assigned to the designated memory frame or the input/output terminal when the processor 2 carries out reading and writing of the data or sending of the input data or fetching of the output data and the like. This address bus 11 is configured so as to be able to transmit the data only one direction from the processor 2 to each of the program memory 3, the storage memory 4 and the I/O port 5.

In the program executing device 1, each address assigned to the memory frame or input/output terminal is represented with 15-bit data. For this purpose, the address bus 11 has 15 signal lines which can respectively transmit one bit signal.

The data bus 12 is used for reading out data from the memory frame or the input/output terminal associated with addresses designated by the processor 2, or for sending the input data or fetching the output data. Further, the data bus 11 is configured so that the processor 2 can communicate with each of the program memory 3, the storage memory 4 and the I/O port 5 in an interactive manner.

Further, as described above, in the program executing device 1, one word is constituted from eight-bit data. Accordingly, the data bus 12 has eight signal lines which respectively transmit one bit signal.

The address decoder (boot signal transmission means) 6 is provided for booting up the access object when the processor 2 accesses each of the program memory 3, the storage memory 4 and the I/O port 5. Here, the access object means one of the program memory 3, the storage memory 4 and the I/O port 5.

In more details, when the address decoder 6 receives an access object signal which indicates an object to be accessed through the access object signal line 41, the address decoder 6 transmits a boot signal to the access object through the corresponding boot signal line. For example, when the access object is the storage memory 4, the address decoder 6 transmits a boot signal through the boot signal line 32.

When the access object is booted up by the boot signal, only the access object receives an address designation signal through the address bus 11, so that the access object becomes a state in which data from the processor 2 can be written therein and data is read out therefrom or a state that input data is sent therefrom (written in) or that output data is fetched (read out) therefrom. In this embodiment, when a voltage level of each of the boot signal lines 31, 32, 33 is in a low level (L), the access object connected via the boot signal line is in an active state, while when a voltage level is in a high level (H), the access object connected via the boot signal line is in a floating state.

In this connection, it is to be noted that the present invention is not limited to the above structure. Namely, in the present invention, the relationship between the signal levels and the statuses of the access object may be reversed so that when a voltage level of each of the boot signal lines 31, 32, 33 is in a high level (H), the access object connected via the boot signal line is in an active state, while when a voltage level of each of the boot signal lines 31, 32, 33 is in a low level (L), the access object connected via the boot signal line is in a floating state.

The read/write signal line 22 is provided for transmitting read/write signals from the processor 2 to each of the program memory 3, the storage memory 4 and the I/O port 5. When a voltage level of the read/write signal line is in a high level (H), each of the program memory 3, the storage memory 4 and the I/O port 5 is in a read enabling state for the processor 2, while when it is in a low level (L), each of the program memory 3, the storage memory 4 and the I/O port 5 is in a write enabling state with respect to the processor 2.

In this connection, it is also to be noted that the present invention is not limited to the above structure. Namely, in the present invention, the relationship between the signal levels and the statuses of the program memory 3, the storage memory 4 or the I/O port 5 may be reversed so that when a voltage level of the read/write signal line is in a low level (L), each of the program memory 3, the storage memory 4 and the I/O port 5 is in a read enable state for the processor 2, while when it is in a high level (H), each of the program memory 3, the storage memory 4 and the I/O port 5 is in a write enable state with respect to the processor 2.

Hereinbelow, a description will be made with regard to the method for executing the programs, that is the operation of the program executing device 1.

In this program executing device 1, when the program is executed, the processor 2 sequentially reads out a program stored in the program memory 3, writes and reads data to and from the storage memory 4 and sends (writes) input data to the I/O port 5 and fetches (reads) output data from the I/O port 5.

In more details, when the power source of the program executing device 1 is turned on from the off state, the processor 2 is initialized. Then, the processor 2 boots up the program memory 3 to read out the program stored in the program memory 3.

When the program (data) is to be read out from the program memory 3, the processor 2 transmits a read signal to the program memory 3 through the read/write signal line 22.

Next, the processor 2 transmits a first address signal through the plural signal lines described above.

An address designation signal in the first address signals is transmitted to the program memory 3 through the address bus 11. Based on this address designation signal, addresses assigned to a memory frame in which the data to be read out is stored are designated.

Further, an access object signal in the first address signal is also transmitted to the address decoder 6 through the access object signal line 41. When the address decoder 6 receives this access object signal, the address decoder 6 transmits a boot signal to the program memory 3 through the boot signal line 31.

The program memory 3 is booted up by the reception of the boot signal, so that the processor 2 receives data stored in the memory frame associated with the designated addresses in the program memory 3.

As a result, the processor 2 is able to read out the data from the program memory 3.

The processor 2 repeatedly carries out the above described operations by designating addresses sequentially from the address #0, for example, thereby enabling to sequentially read out the data stored in the memory frames associated with the designated addresses.

When the program read out from the program memory 3 contains an instruction that writes data to a designated memory frame in the storage memory 4, the processor 2 boots up the storage memory 4 to write the data to the designated memory frame.

When writing data to the storage memory 4, the processor 2 transmits the data to be written through the data bus 12 and transmits a write signal to the storage memory 4 through the read/write signal line 22.

Next, the processor 2 transmits a first address signal through the plural signal lines described above.

An address designation signal in the first address signal is transmitted to the storage memory 4 through the address bus 11. With this result, addresses assigned to a memory frame to which the data is to be written are designated.

Further, an access object signal in the first address signal is also transmitted to the address decoder 6 through the access object signal line 41. When the address decoder 6 receives this access object signal, the address decoder 6 transmits a boot signal to the storage memory 4 through the boot signal line 32.

The storage memory 4 boots up upon receipt of this boot signal, and then data sent from the processor 2 is written to the memory frame associated with the designated addresses in the storage memory 4.

In this way, the processor 2 can write data to the storage memory 4.

Further, if there is an instruction that reads out data from a predetermined memory frame of the storage memory 4 in the program read out from the program memory 3, for example, the processor 2 boots up the storage memory 4 and then reads out the data from the predetermined memory frame.

When the data is to be read out from the storage memory 4, the processor 2 first transmits a read signal to the storage memory 4 through the read/write signal line 22.

Then, the processor 2 transmits a first address signal through the plural signal lines.

An address designation signal in the first address signal is transmitted to the storage memory 4 through the address bus 11. With this result, addresses assigned to the memory frame in which the data to be read out is stored are designated.

Further, an access object signal in the first address signal is also transmitted to the address decoder 6 through the access object signal line 41. When the address decoder 6 receives this access object signal, the address decoder 6 transmits a boot signal to the storage memory 4 through the boot signal line 32.

The storage memory 4 is booted up upon receipt of this boot signal. Then, the processor 2 receives data stored in the memory frame in the storage memory 4 associated with the designated addresses.

In this way, the processor 2 can read out the data from the storage memory 2.

Further, if there is an instruction that sends input data to other component device in the program read out from the program memory 3, for example, the processor 2 boots up the I/O port 5 and then sends the input data to an input terminal associated with the other component device.

When the input data is to be sent to the I/O port 5, the processor 2 transmits the input data through the data bus 12 and transmits a write signal to the I/O port through the read/write signal line.

Next, the processor 2 transmits a first address signal through the plural signal lines.

An address designation signal in the first address signal is transmitted to the I/O port 5 through the address bus 11. With this result, an address assigned to the input terminal to which the input data is sent is designated.

Further, an access object signal in the first address signal is transmitted to the address decoder 6 through the access object signal 41. When the address decoder 6 receives this access object signal, the address decoder 6 transmits a boot signal to the I/O port 5 through the boot signal line 33.

The I/O port 5 is booted up upon receipt of this boot signal so that the processor 2 sends the input data to the input terminal associated with the designated addresses.

In this way, the I/O port 5 is able to send the input data to the other component device. The component device can perform various operations by receiving the input data.

Further, if there is an instruction that fetches output data from other component device, for example, in the program read out from the program memory 3, the processor 2 boots up the I/O port 5 and then fetches the output data from an output terminal associated with the other component device.

When the output data is to be fetched from the I/O port 5, the processor 2 first transmits a read signal to the I/O port 5 through the read/write signal line 22.

Then, the processor 2 transmits a first address signal through the plural signal lines.

An address designation signal in the first address signal is also transmitted to the I/O port 5 through the address bus 11. With this result, addresses assigned to the output terminal from which the output data is fetched are designated.

Further, an access object signal in the first address signals is also transmitted to the address decoder 6 through the access object signal line 41. When the address decoder 6 receives this access object signal, the address decoder 6 transmits a boot signal to the I/O port 5 through the boot signal line 33.

The I/O port 5 is booted up upon receipt of this boot signal so that the processor 2 can fetch the output data from the output terminal of the I/O port 5 associated with the designated addresses through the data bus 12.

In this way, the processor 2 can fetch the output data from the I/O port 5. Further, when the processor 2 fetches the output data, the processor 2 can perform operations based on the output data and analyze the output data and the like.

In the program executing device 1 as described above, when any bug is found in the program or when the function of the electrical or electronic apparatus equipped with the program executing device 1 is to be upgraded, it is necessary to debug the bug or to perform version up of the function.

In such a case, the program stored in the program memory 3 of the program executing device 1 is erased, and then a new program from which the bug has be debugged or of which function has been upgraded is written to the memory block in which the previous program was stored.

When the writing of the new program is properly carried out, the program executing device 1 can read out the new program. Namely, the program executing device 1 can execute the debugged program or the upgraded program.

However, in these program executing devices, when the new program can not be properly written, e.g. when the power source is turned off during the writing of the new program, there is a possibility that both the previous program and the new program do not exist in the program memory 3.

When both the previous program and the new program do not exist in the program memory 3, that is when the program (first program) which is used for controlling normal operations of the electrical or electronic apparatus equipped with the program executing device 1 can not be properly executed, it becomes not possible to properly boot up (activate) the electrical or electronic apparatus equipped with the program executing device 1.

In case of such an unusual accident, the program memory 3 stores, in addition to the first program, another program for emergency use (a second program) which boots up or activates the electrical or electronic apparatus instead of the first program.

The second program is executed only when the first program can not be executed properly. That is, in the program executing device 1, there is no case that the second program is executed simultaneously with the first program.

Further, in the program executing device 1, the first program and the second program are produced using the same source program.

Here, the first program is programmed so that the processor 2 accesses a first memory area of the storage memory 4, and the second program is programmed so that the processor 2 accesses a second memory area of the storage memory 4.

Further, the program executing device 1 of the present invention includes memory converting means for converting two first address signals which are different only in their bit signals outputted to a predetermined signal line in the plural signal lines into the same address signals (second address signals). In this embodiment, this memory converting means is constituted from the plural signal lines (the address bus 11 and the access object signal line 41), the address decoder 6 and the boot signal line 32.

Due to the provision of the memory converting means, in the case where the processor 2 is to write and read data to and from the second memory area of the storage memory 4 based on the second program, the processor 2 accesses the first memory area of the storage memory 4 even though the processor 2 is to access the second memory area based on the second program.

Hereinbelow, the above operations provided by the memory converting means will be described in details.

FIG. 3 is a chart which shows examples of first address signals which are to be transmitted when the processor 2 accesses the first memory area or the second memory area of the storage memory 4, in which the address signals are indicated with a binary code and a hexadecimal code.

In this figure, bit signals (A0 to A14) from the lowest bit (A0) to the 15th bit (A14) are address designation signals 301. Further, bit signals (A15 to A23) from the 16th bit to the highest bit (A23) are access object signals.

As described above, each of the address designation signals 301 represents the addresses assigned to the memory frame of the program memory 3, the storage memory 4 or the input and output terminals of the I/O port 5.

Further, as described above, each of the access object signals 302 is transmitted to the address decoder 41 through the access object signal line 41.

The address decoder 6 transmits the boot signal to the access object based on the access object signal 302. In this way, only the access object that receives this boot signal is booted up.

Further, in FIG. 3, the first address signal "a" 010000 is a signal that designates start addresses 0000 in the area of the access object 002, and the first address signal "b" 017FFF is a signal that designates end addresses 7FFF in the area of the access object 002.

The first address signal "a" and the first address signal "b" are transmitted when the processor 2 accesses the first memory area of the storage memory 4 based on the first program to access a memory frame associated with the start addresses and a memory frame associated with the end addresses.

The first address signal "c" 018000 is a signal which designates start addresses 0000 in the area of the access object 003, and the first address signal "d" 01FFFF is a signal which designates end addresses 7FFF in the area of the access object 003.

The first address signal "c" and the first address signal "d" are transmitted when the processor 2 accesses the second memory area of the storage memory 4 based on the second program to access a memory frame associated with the start addresses and a memory frame associated with the end addresses.

In this embodiment, the address decoder 6 is configured so that it transmits a boot signal to the storage memory 4 at the time when the access object signal 302 is either of 002 or 003.

In other words, the address decoder 6 is configured so that, in spite of the difference between the access object signal 302 which is received by the address decoder when the processor 2 is to access the second memory area based on the second program and the access object signal 302 which is received by the address decoder when the processor 2 is to access the first memory area based on the first program, when the processor 2 accesses the second memory area of the storage memory 4 based on the second program, the address decoder 6 transmits the same boot signal as that which is used when the processor 2 accesses the first memory are to the storage memory 4 to boot up it.

In this connection, it is to be noted that in the present invention, the boot signal and the address designation signal 301 constitute a second address signal.

Further, each of the first address signal "a" and the first address signal "c" has start addresses 0000 in its address designation signal 301. Namely, they have the same address designation signal 301.

Accordingly, by the address decoder 6, the first address signal "a" and the first address signal "c" which are different from each other only in their access object signals 302 are converted into the same second address signal, respectively.

Further, the first address signal "b" and the first address signal "d" which have the same address designation signals 301 having the same end addresses 7FFF but only their access object signals 302 are different from each other are also converted into the same second address signals, respectively.

Further, each first address signal which designates the addresses from the start addresses to the end addresses when the processor 2 accesses the first memory area of the storage memory 4 based on the first program and each first address signal which designates the addresses from the start addresses to the end addresses when the processor 2 accesses the second memory area of the storage memory 4 based on the second program are also converted into the same second address signal, respectively.

Namely, the first address signals which are transmitted when the processor 2 accesses the second memory area based on the second program are also converted into the second address signals which are the same as the second address signals which are converted from the first address signals transmitted when the processor 2 accesses the first memory area of the storage memory 4 based on the first program.

In this way, when the processor 2 is to access the second memory area based on the second program, the processor 2 accesses the first memory area of the storage memory 4.

As described above, according to the program executing device 1 and the executing method of the present invention, even though the first and second programs are produced using the same source program, when the processor 2 is to access the second memory area based on the second program, the processor is capable of accessing the memory area which is the same as the first memory area of the storage memory 4 which is a memory area that the processor 2 would access based on the first program.

Accordingly, since it is not necessary for the storage memory 4 to have such a second memory area, the memory capacity of the storage memory can be reduced.

This makes it possible to reduce manufacturing cost of the program executing device 1, and also makes it possible to minimize the size of the program executing device 1 and reduce the weight thereof.

With this results, the manufacturing cost of the electrical or electronic apparatus equipped with the program executing device 1 can be reduced, thereby also making it possible to minimize the size of the electrical or electronic apparatus and reduce the weight thereof.

In addition, since the first and second program can be produced using the same source program, it is possible to shorten times required for producing the first and second programs. Further, management for the programs can be simplified.

Further, in this embodiment, the memory area of the storage memory 4 can be commonly used by the first and second programs without reducing the number of the signal lines which output the first-address signals from the processor 2.

Second Embodiment

Figure 4:
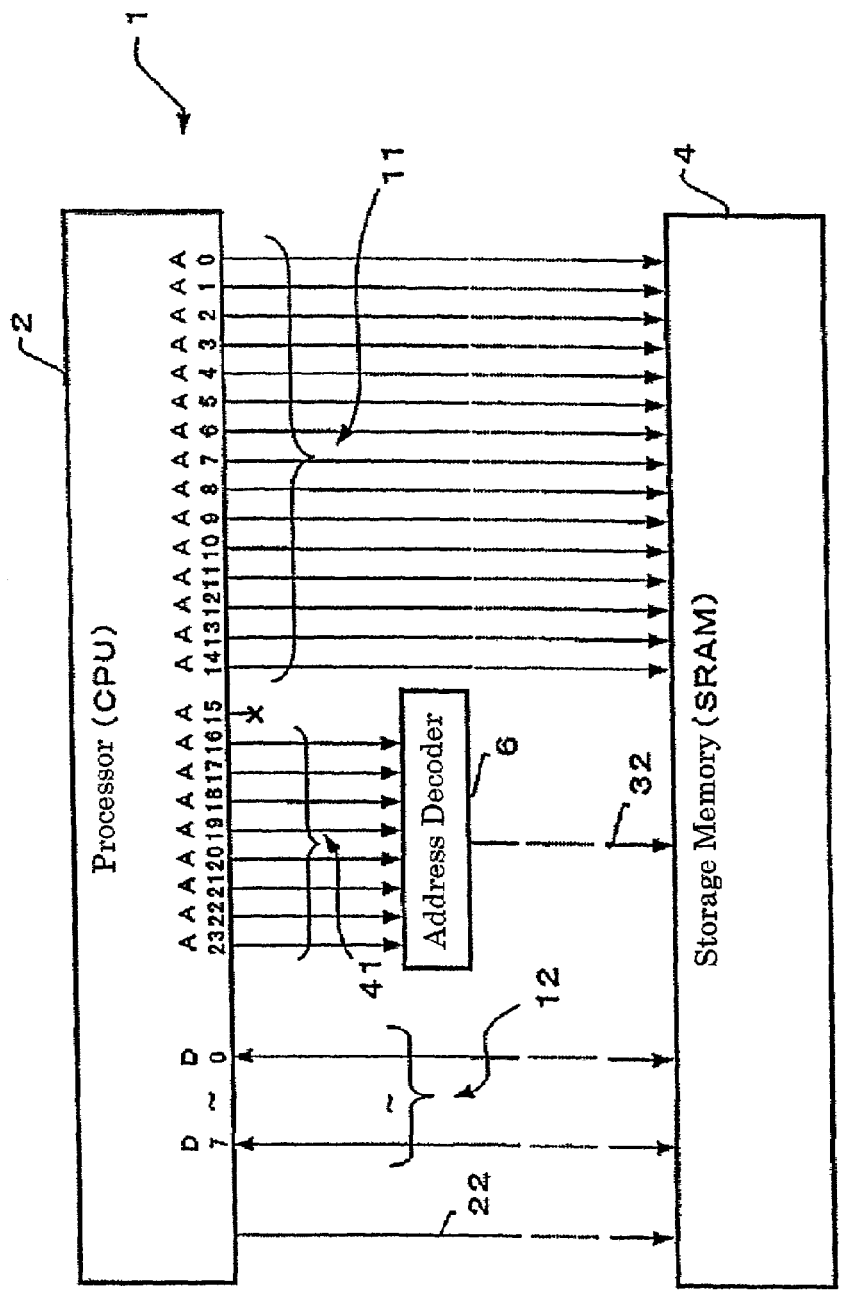
FIG. 4 is a block diagram which shows one example of connection between a processor and a storage memory in a program executing device of a second embodiment of the present invention.
Figure 5:
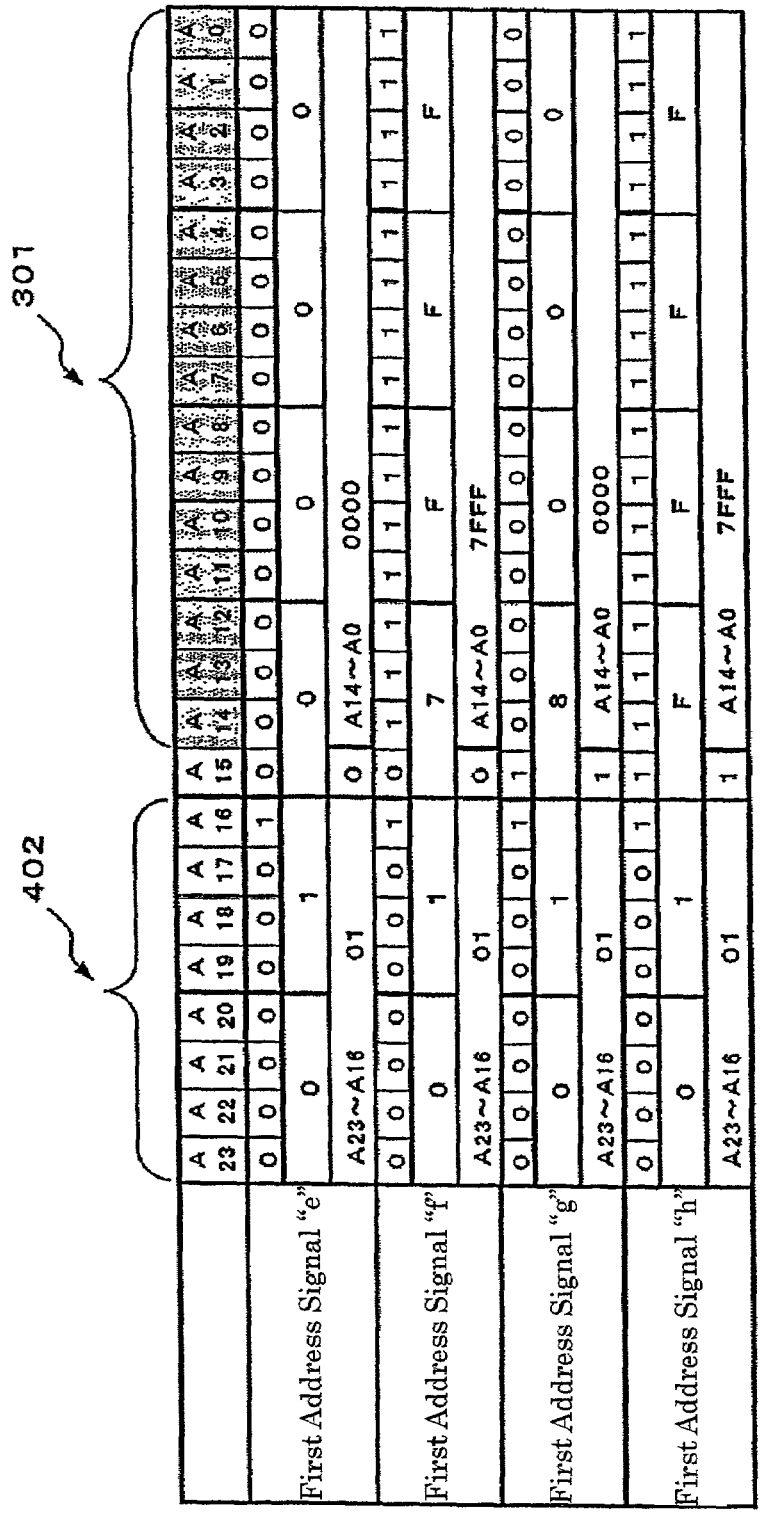
FIG. 5 is a chart which shows an example of first address signals which are transmitted when the processor accesses a first memory area or a second memory area of the storage memory, in which each address signal is represented with a binary code or a hexadecimal code.

FIG. 4 is a block diagram which shows one example of connection between the processor and the storage memory in the program executing device of the second embodiment of the present invention, and FIG. 5 is a chart which shows examples of first address signals which are transmitted when the processor accesses a first memory area or a second memory area of the storage memory, in which the signals are indicated with a binary code and a hexadecimal code.

Hereinbelow, the second embodiment of the program executing device 1 of the present invention will be described with reference to the FIGS. 4 and 5. In this regard, it is to be noted that the description will be made by focusing the differences between the first and second embodiments, and the description to the common elements or structures is omitted.

In this second embodiment, as shown in FIG. 4, a signal line corresponding to the bit A15 in the plurality of signal lines for outputting the first address signal is opened. Further, as shown in FIG. 5, the access object lines are composed of bit signals (A16 through A23) from the 17th bit to the highest bit (A23).

In FIG. 5, the first address signal "e" 010000 is a signal that designates start addresses 0000 in the area of the access object 01, and the first address "f" 017FFF is a signal that designates end addresses 7FFF in the area of the access object 002.

The first address signal "e" and the first address signal "f" are transmitted respectively when the processor 2 accesses the first memory area of the storage memory 4 based on the first program to access a first memory frame associated with the start addresses and a memory frame associated with the end addresses.

Further, the first address signal "e" and the first address signal "f" respectively output 0 (zero) as the bit A15.

The first address signal "g" 018000 is a signal which designates start addresses 0000 in the area of the access object 01, and the first address signal "h" 01FFFF is a signal which designates end addresses 7FFF in the area of the access object 01.

The first address signal "g" and the first address signal "h" are transmitted when the processor 2 accesses the first memory area of the storage memory 4 based on the second program to access a memory frame associated with the start addresses and a memory frame associated with the end addresses.

Further, the first address signal "5" and the first address signal "h" respectively output 1 (one) as the bit A15.

In this embodiment, the address decoder 6 is configured so that it transmits a boot signal to the storage memory 4 at the time when the access object signal 402 is "01".

Here, the first address signal "e" outputs 0 (zero) to the bit A15, and the first address signal "f" outputs 1 (one) to the bit A15. However, in the both cases, the access object signals are "01" and the address designation signals have the start addresses of 0000 so that their converted second address signals become the same as with each other.

Therefore, the first address signal "e" and the first address signal "f", which are different from each other only in the bit signals that are outputted to the signal line corresponding to the bit A15, are converted to the same second address signal, respectively.

Further, as is the same with the above, the first address designation signal "f" and the first address designation signal "h" each having the access object signal 01 and the address designation signal with the start addresses of 7FFF, which are different from each other only in the bit signals that are outputted to the signal line corresponding to the bit A15, are converted to the same second address signal, respectively.

Further, the first address signal which designates the addresses from the start addresses to the end addresses when the processor 2 accesses the first memory area of the storage memory 4 based on the first program, and the first address signal which designates the addresses from the start addresses to the end addresses when the processor 2 accesses the second memory area of the storage memory 4 based on the second program are converted into the same second address signal, respectively.

Namely, the first address signals which are transmitted when the processor 2 accesses the second memory area based on the second program are also converted into second address signals which are the same as the second address signals which are converted from the first address signals transmitted when the processor 2 accesses the first memory area of the storage memory 4 based on the first program.

In this way, when the processor 2 is to access the second memory area based on the second program, the processor 2 accesses the first memory area of the storage memory 4.

As described above, as is the same with the first embodiment, according to the program executing device 1 of the second embodiment, even though the first program and the second program are produced using the same source program, when the processor 2 accesses the second memory area based on the second program, the processor is capable of accessing the memory area which is the same as the first memory area of the storage memory 4 which is a memory area that the processor 2 would access based on the first program. Therefore, it is possible to obtain the same advantages as those of the first embodiment.

Further, according to the second embodiment, only by opening one predetermined signal line within the signal lines from which the first address signals are outputted, it is possible to commonly share the same memory area of the storage memory 4, so that it is possible to use the existing circuits such as the address decoder 6 as they are, for example.

The program executing device and the method for executing the programs according to the present invention described above may be applied to various electrical or electronic apparatuses such as personal computers, optical disc drives, mobile phones, game apparatuses, televisions, microwave ovens, air conditioners and the like.

In the foregoing, the program executing device and the method for executing the programs according to the present invention have been described with reference to the embodiments shown in the drawings. However, the present invention is not limited thereto, and it is possible to replace the structures and the components of the device with those having the same or similar functions.

Further, in the present invention, three or four or more programs that are produced using the same source program may be stored in a storage memory, and in such a case, it is configured so that a processor is capable of accessing the same memory area of the storage memory when the processor is to access respective memory areas.

Furthermore, in the present invention, the storage memory has a plurality of memory areas. Alternatively, the storage memory is constituted from a plurality of memories.

For example, if the storage memory has first and second memory areas and first to fourth programs are stored therein, the program executing device of the present invention may be configured as follows. When the processor 2 is to access associated memory areas based on the first and second programs which are produced using the same source program, the processor 2 accesses the first memory area of the storage memory, respectively, and when the processor 2 is to access associated memory areas based on the third and fourth programs which are produced using the same source program, the processor accesses the second memory area of the storage memory.

Further, the program executing device of the present invention may be provided with a plurality of program memories. Further, in the present invention, one or more of the program memory, storage memory, I/O port and address decoder may be integrally provided within the processor.

As described above, according to the present invention, when the processor 2 accesses the second memory area based on the second program, the processor is capable of accessing the memory area which is the same as the first memory area of the storage memory 4 which is a memory area that the processor 2 would access based on the first program. Therefore, the first and second program can be produced using the same source program, and thereby the memory capacity of the storage memory can be reduced.

Finally, the present invention is not limited to the embodiments described above, it goes without saying that various changes and modifications can be made without departing from the scope of the present invention which is determined by the following claims.

What is claimed is:

1. A program executing device, comprising:
 a processor;
 a program memory in which a first program and a second program are stored wherein the first program is a program which is executed in performing an ordinary operation, and the second program is a program which is used only when the first program is not properly executed;
 a storage memory for performing write and read of data used for executing the first and second programs, the storage memory including first and second memory areas, in which the first program is programmed so as to access the first memory area of the storage memory and the second program is programmed so as to access the second memory area of the storage memory; and
 memory area converting means which is configured so that in a case where the processor performs write and read of the data in the second memory area based on the second program, the processor is adapted to automatically access the first memory area when the processor is to access the second memory area through predetermined address conversion.

2. The program executing device as claimed in claim 1, wherein the memory area converting means has a plurality of signal lines through which address signals are outputted, in which the memory area converting means is configured so that two address signals which are different from each other only in their bit signals which are outputted to one of the signal lines are converted into the same address signal.

3. The program executing device as claimed in claim 2, wherein the signal lines for outputting the address signals includes at least one access object signal line which outputs an access object signal in each address signal, in which the memory area converting means includes boot signal transmission means which is connected to the processor through the access object signal line for booting up the storage memory based on the access object signal, wherein the boot signal transmission means is configured so that even in the case where the access object signal which is received when the processor accesses the second memory area based on the second program is different from the access object signal which would be received when the processor accesses the first memory area based on the first program, the processor sends the same boot signal as that which is sent when the processor would access the first memory area to boot up the storage memory when the processor is to access the second memory area.

4. The program executing device as claimed in claim 2, wherein a predetermined signal line is opened.

5. The program executing device as claimed in claim 1, wherein the program memory includes a program-rewritable non-volatile memory.

6. The program executing device as claimed in claim 1, wherein the program memory includes a plurality of memory areas and the programs can be rewritten in each of the memory areas.

7. Method for executing programs for executing a first program which is programmed so that a processor accesses to a first memory area of a storage memory and a second program which is programmed so that the processor accesses a second memory area of the storage memory, the method being characterized in that in a case where the processor performs write and read of the data in the second memory area based on the second program, the processor is adapted to automatically access the first memory area when the processor is to access the second memory area based on the second program through predetermined address conversion, wherein the first program is a program which is executed in performing an ordinary operation, and the second program is a program which is used only when the first program is not properly executed.

8. The method as claimed in claim 7, wherein two address signals which are different from each other only in their bit signals in a predetermined signal line in a plurality of signal lines for outputting the address signals from the processor are converted into the same address signal, so that when the processor is to access the second memory area based on the second program, the processor is adapted to access the first memory area.

9. A program executing device, comprising:
a processor;
a program memory in which a first program and a second program are stored;
a storage memory for performing write and read of data used for executing the first and second programs, the storage memory including first and second memory areas, in which the first program is programmed so as to access the first memory area of the storage memory and the second program is programmed so as to access the second memory area of the storage memory; and
memory area converting means which is configured so that in a case where the processor performs write and read of the data in the second memory area based on the second program, the processor is adapted to automatically access the first memory area when the processor is to access the second memory area through predetermined address conversion wherein the memory area converting means has a plurality of signal lines through which address signals are outputted, in which the memory area converting means is configured so that two address signals which are different from each other only in their bit signals which are outputted to one of the signal lines are converted into the same address signal and further wherein the signal lines for outputting the address signals includes at least one access object signal line which outputs an access object signal in each address signal, in which the memory area converting means includes boot signal transmission means which is connected to the processor through the access object signal line for booting up the storage memory based on the access object signal, wherein the boot signal transmission means is configured so that even in the case where the access object signal which is received when the processor accesses the second memory area based on the second program is different from the access object signal which would be received when the processor accesses the first memory area based on the first program, the processor sends the same boot signal as that which is sent when the processor would access the first memory area to boot up the storage memory when the processor is to access the second memory area.

* * * * *